(12) United States Patent  
Schnitzer (10) Patent No.: US 8,051,734 B2  
(45) Date of Patent: Nov. 8, 2011

(54) GEAR SHIFT DEVICE FOR AN AUTOMATIC TRANSMISSION OF A MOTOR VEHICLE

(75) Inventor: Detlef Schnitzer, Denkendorf (DE)

(73) Assignee: Daimler AG, Stuttgart (DE)

( * ) Notice: Subject to any disclaimer, the term of this patent is extended or adjusted under 35 U.S.C. 154(b) by 1069 days.

(21) Appl. No.: 11/973,359

(22) Filed: Oct. 4, 2007

(65) Prior Publication Data

US 2008/0070749 A1    Mar. 20, 2008

Related U.S. Application Data

(63) Continuation-in-part of application No. PCT/EP2006/061230, filed on Mar. 31, 2006.

(30) Foreign Application Priority Data

Apr. 5, 2005   (DE) .......................... 10 2005 015 481

(51) Int. Cl.  
*F16H 59/00* (2006.01)

(52) U.S. Cl. ...................... 74/335; 74/473.11; 74/473.36

(58) Field of Classification Search .................... 74/335, 74/337.5, 473.1, 473.11, 473.14–15, 473.36, 74/606 R  
See application file for complete search history.

(56) References Cited

U.S. PATENT DOCUMENTS

| 3,106,941 | A | * | 10/1963 | Plummer | ....................... 138/128 |
| 5,417,124 | A | * | 5/1995 | Huff et al. | ......................... 74/335 |
| 5,450,767 | A | * | 9/1995 | Willford et al. | ................. 74/335 |
| 5,845,544 | A | * | 12/1998 | Huggins et al. | ............. 74/606 R |
| 2002/0062714 | A1 | * | 5/2002 | Albert et al. | ................ 74/606 R |

* cited by examiner

*Primary Examiner* — David D Le  
*Assistant Examiner* — Huan Le  
(74) *Attorney, Agent, or Firm* — Klaus J. Bach (57) ABSTRACT

In a gear shift device for an automated shift transmission of a motor vehicle having a main transmission and an auxiliary group, wherein a series of gear shift elements, for example in the form of gear shift forks, have to be operated, piston cylinder units for shifting the main transmission are combined in a gear shift module and the piston cylinder units for shifting the auxiliary group are arranged spaced apart from the gear shift module of the main transmission but connected to the gear shift module via a fluid line.

14 Claims, 5 Drawing Sheets

GEAR SHIFT DEVICE FOR AN AUTOMATIC TRANSMISSION OF A MOTOR VEHICLE

This is a Continuation-In-Part application of pending international patent application PCT/EP2006/061230 filed Mar. 31, 2006 and claiming the priority of German patent application 10 2005 015 481.6 filed Apr. 5, 2005.

BACKGROUND OF THE INVENTION

The invention relates to a gear shift device for an automated transmission of a motor vehicle having a main transmission and an auxiliary group and a series of gear shift elements for shifting the gears of the transmission.

DE 697 11 286 T2 describes a gear shift device for a transmission of a motor vehicle in which gear shift elements of an auxiliary group of the transmission can be actuated by means of electromagnetically activated valves in the form of solenoid valves. A gear shift element is operated by a gear shift rod which is connected to a piston of a piston cylinder unit. A solenoid valve can cause the piston and thus the gear shift rod to be moved by feeding fluid in the form of compressed air into the piston cylinder unit or discharging it from said piston cylinder unit. The gear shift device has a gear shift module which comprises a plurality of piston cylinder units. A main transmission is shifted by means of a gear shift lever which can be operated by the driver of the vehicle.

It is the object of the present invention is to provide a gear shift device which permits automated operation of all the gear shift elements of the transmission.

SUMMARY OF THE INVENTION

In a gear shift device for an automated shift transmission of a motor vehicle having a main transmission and an auxiliary group, wherein a series of gear shift elements, for example in the form of gear shift forks, have to be operated, piston cylinder units for shifting the main transmission are combined in a gear shift module and the piston cylinder units for shifting the auxiliary group are arranged spaced apart from the gear shift module of the main transmission but connected to the gear shift module via a fluid line.

The gear shift elements are connected, for example via gear shift rods, to movable pistons of the piston cylinder units. Compressed air or transmission oil can be used, for example, as the operating fluid. The piston cylinder units for operating the main transmission are combined in a transmission shift module. The cylinders of the piston cylinder units are thus at least partially formed by the gear shift module. In contrast, the piston cylinder unit for operating the auxiliary group which is arranged spaced apart from the gear shift module can be arranged, for example, within a housing of the auxiliary group.

The described design of the gear shift device permits automated operation of all the gear shift elements of the transmission with a low overall requirement for installation space. Furthermore, it is possible to arrange a multiplicity of required ducts for the operating fluid within the gear shift module.

In one embodiment of the invention, the gear shift module has a module baseplate which forms part of the cylinders of the piston cylinder units and at least part of a housing of a countershaft brake and/or part of a central clutch disengager of a starting clutch.

The module baseplate, which can be manufactured as a cast part, for example from aluminum, therefore also forms part of the countershaft brake and of the central clutch disengager. These parts do not have to be fabricated separately, which would entail higher costs. Furthermore, this results in a low number of different components of the gear shift device, which simplifies the assembly of the gear shift device and keeps the costs for storing the components low.

The countershaft brake can be used to brake a countershaft of the transmission during shifting up operations. The countershaft brake is also activated with the operating fluid by means of which the piston cylinder units which are assigned to the gear shift elements of the transmission can also be activated.

The starting clutch is arranged in particular between an engine and the transmission and is embodied as an automatic friction clutch. The central clutch disengager of the clutch is likewise operated by means of the aforesaid operating fluid. The module baseplate forms, in particular, part of a carrier body of the central clutch disengager. An annular piston of the clutch disengager is guided on the carrier body when the clutch opens and closes. The design and the mode of operation of a central clutch disengager are described in detail in DE 100 49 459 A1, the contents of which are herewith incorporated into the disclosure of the present application.

Preferably, an individual gear shift element of the main transmission or of the first auxiliary group is assigned to each piston cylinder unit. A piston of a piston cylinder unit is connected, for example by means of a gear shift rod, to a single gear shift fork. As a result, the gear shift elements can be actuated completely independently of one another.

The transmission may have a second auxiliary group. This can be embodied, for example, as a split group which is arranged between the starting clutch and the main transmission. A piston cylinder unit for operating a gear shift element of the second auxiliary group is arranged in the gear shift module. As a result the necessary ducts can also be provided in the gear shift module so that no additional fluid lines are necessary.

In a particular embodiment of the invention, the gear shift elements can be actuated by means of electromagnetically activated valves. The gear shift module has recesses, each recess being able to partially accommodate one of the valves. The valves are actuated by a control device which is arranged on the gear shift module. The control device has recesses, it being likewise possible for each recess to partially accommodate one of the valves. Furthermore, the control device has coils by means of which the valves can be activated electromagnetically. The gear shift module, the valves and the control device are each embodied here as individual components, that is, the valve and the associated coil are not combined in one component.

As a result, there is no need for cabling between the coils of the valves and the control device outside the control device. Cabling which is possibly necessary can be provided completely within the control device. As a result, the cabling of the coils can be checked completely before the gear shift device is assembled. Furthermore, it is not necessary to carry out any cabling of the coils during the assembly process, which saves time and rules out a possible source of faults. During the operation of the gear shift device, a housing of the control device protects the possibly necessary cabling against damage.

Preferably, all the valves are mutually interchangeable. This is ensured by virtue of the fact that all the valves have the same ports and the same dimensions. In particular, all the valves of the gear shift device are identical. As a result, it is not possible for different valves to be mistaken for one another when the gear shift device is being assembled. This simplifies the assembly process and the risk of making a mistake during the assembly process is low. If a defect occurs in a valve while the motor vehicle is operating and there is no replacement valve available, the valves can be interchanged for one another. If the defective valve is absolutely necessary for the operation of the transmission, it can be exchanged for a valve which is not absolutely needed. For example, a valve for actuating a range change group of a group transmission is necessary to operate the transmission, while the transmission continues to be operationally capable with a defective valve of a split group. In this case, a defective valve for the range change group could be replaced with an undamaged valve from the split group.

In one embodiment of the invention, the recesses in the gear shift module and the control device are arranged in such a way that the control device and the valves can be removed without having to open a housing of the transmission. Valves or the control device can therefore be replaced or exchanged at very low cost.

Given corresponding installation of the transmission in the motor vehicle, it is thus possible for valves to be replaced or interchanged for one another in the installed state of the transmission. It is thus also possible to exchange the control device without having to remove the transmission from the motor vehicle. It is thus possible to carry out any repairs easily and cost effectively. If there is no workshop available, the parts can be replaced or exchanged using an on-board tool which is available. This permits a high level of availability of the transmission and thus of the motor vehicle.

In a particular embodiment of the invention, the gear shift device has a sensor module which is arranged spaced apart from the gear shift module. The sensor module has sensors by means of which operating variables of the transmission can be sensed. Operating variables are, for example, rotational speeds of a main shaft and countershaft, positions of the gear shift rods, and thus of the gear shift elements, and the temperature of the transmission oil. The sensors have an at least indirect signal conducting connection to the control device. As a result, the control device can process the sensed operating variables and take them into account during the actuation of the valves. Combining the sensors in one sensor module makes it possible to prefabricate the entire sensor module as one unit. The necessary electrical connections can be provided, for example, on a circuit board of the sensor module. The sensor module can be tested before being installed in the transmission.

Expediently, the sensor module includes an evaluation module which picks up signals from the sensors, preprocesses them and transmits them to the control device via data lines. The preprocessing can, for example, reside in the evaluation module calculating the operating variables from the raw signals of the sensors and additionally carrying out low pass filtering of the signals. The evaluation module and the control device can be connected via a serial bus connection, for example a CAN bus. A separate electrical connection to the control device therefore does not have to be provided for each sensor. It is sufficient to produce just one connection between the evaluation module and the control device. This is very cost effective and has a low level of susceptibility to faults.

Generally, the sensor module is supplied with a supply voltage by the control device via supply lines. The supply lines can, in particular, run parallel to the necessary signal lines.

In a particular embodiment of the invention, supply lines and/or signal lines between the sensor module and the control device extend, in a partial section, along the fluid line between the gear shift module and the piston cylinder unit of the auxiliary group. In particular, the fluid line, the supply lines and/or data lines in the aforesaid partial section are embedded together in a plastic sheath.

The lines can be encapsulated by injection molding with, for example, a thermoplast. The connecting lines are thus embodied as a rigid structure, which nevertheless has a certain degree of flexibility. The contour of the connecting line structure can be defined in such a way that it is adapted precisely to the existing installation space, for example within the housing of the transmission. The profile of the supply lines and of the data lines, which do not have any fixed contour, is also defined. This is necessary in order to prevent damage to the electrical lines when the drive assembly is operating. Otherwise, the electrical lines would have to be secured to other locations of the transmission while the transmission is being assembled.

The electrical lines are additionally protected by the plastic sheath in which they are embedded. This applies during both to the assembly and during the operation of the transmission.

The invention will become more readily apparent from the following description of exemplary embodiments thereof which are illustrated in a simplified form and described below on the basis of the accompanying drawings:

DESCRIPTION OF PARTICULAR EMBODIMENT

Figure 1:
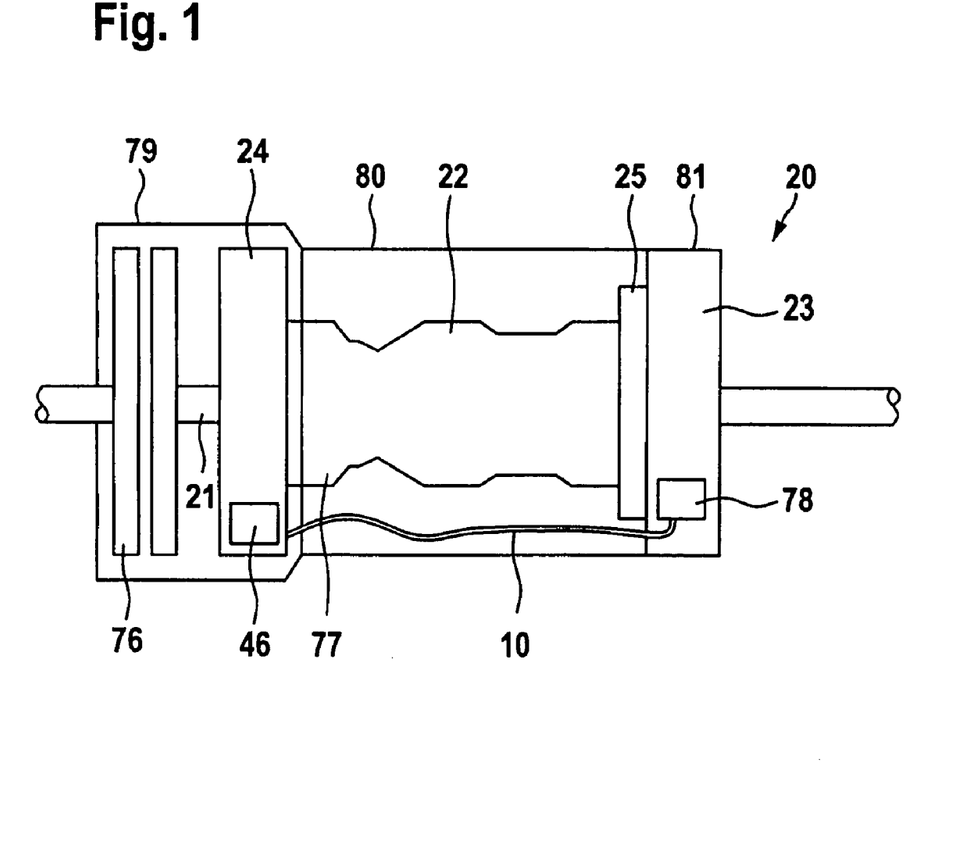
FIG. 1 is a schematic illustration of an automatic transmission.

As shown in FIG. 1, an automated transmission 20, in the form of a gear wheel speed-changing transmission of a countershaft design, has a transmission input shaft 21 which is connected to an engine (not illustrated) by means of an automatic starting clutch 76. The transmission 20 has a split group 77, a main transmission 22 and a group transmission 23 in the form of a range change group which is connected downstream. Gear shift elements of the main transmission 22 and of the split group 77 which are not illustrated in FIG. 1 are activated by piston cylinder units (not illustrated) which are combined in a gear shift module 24. The gear shift module 24 is arranged between the starting clutch 76 and split group 77. A gear shift element (not illustrated) of the group transmission 23 is operated by a piston cylinder unit 78, which is arranged within the group transmission 23. A sensor module 25 is arranged between the main transmission 22 and the group transmission 23. The sensor module 25 has sensors (not illustrated) by means of which rotational speeds of the transmission 20 and positions of the gear shift elements can be sensed. Furthermore, the sensor module 25 has an evaluation module 113 which is not illustrated in FIG. 1 (see FIG. 4) and which preprocesses the sensed sensor signals and transmits them to a control device 46 of the transmission 20. The control device 46 is arranged on the gear shift module 24, as are all the valves for actuating the piston cylinder units.

The gear shift module 24 is connected via a connecting line 10 to the sensor module 25 and the group transmission 23. The various elements of the transmission 20 are arranged in three housing parts which together form a housing of the transmission 20. The starting clutch 76 and the gear shift module 24 are arranged in a front housing part 79 which is connected to the engine. The front housing part 79 is adjoined by a central housing part 80 in which the split group 77, the main transmission 22 and the sensor module 25 are arranged. The housing of the transmission 20 is closed off by a rear housing part 81 which includes the group transmission 23 which is connected downstream.

Figure 2:
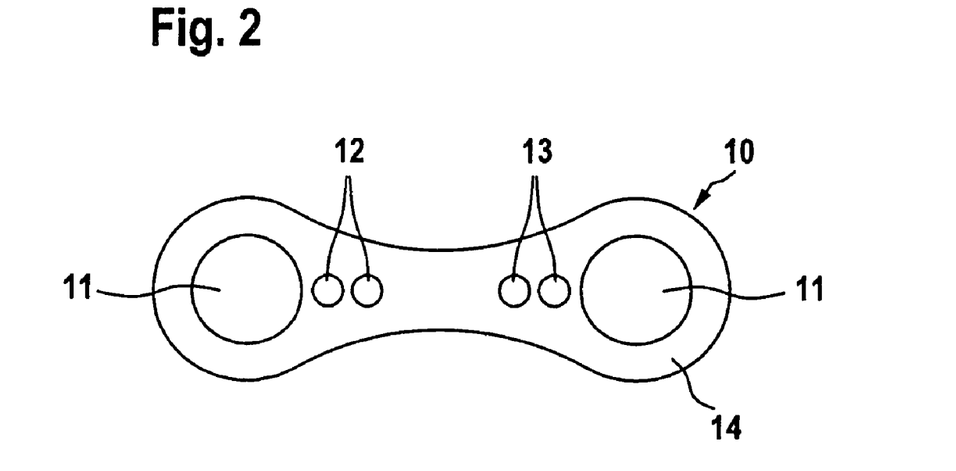
FIG. 2 shows a cross section through a connecting line with fluid lines and electrical lines.

According to FIG. 2, the connecting line 10 has two fluid lines 11 which are composed of bent metal tubes. The fluid lines 11 are arranged parallel to one another. Valves which are assigned to the group transmission 23 and which are also arranged in the gear shift module 24 are connected to the piston cylinder unit 78 in the downstream group 23 by means of the fluid lines 11.

The connecting line 10 also contains electric lines 12 for supplying voltage to the sensor module 25, as well as signal lines 13 for transmitting the signals from the evaluation module 113 of the sensor module 25 to the control device 46. The electric lines 12 and the signal lines 13 run parallel to and between the two fluid lines 11. The electric lines (power lines 12 and signal lines 13) are embedded, together with the fluid lines 11, in a plastic sheath 14. The plastic sheath 14 surrounds the fluid lines 11, the power lines 12 and the signal lines 13 completely.

It would also be conceivable for parts of the cross sections of the fluid lines 11, of the power lines 12 and of the signal lines 13 to project out of the plastic sheath 14.

Figure 3:
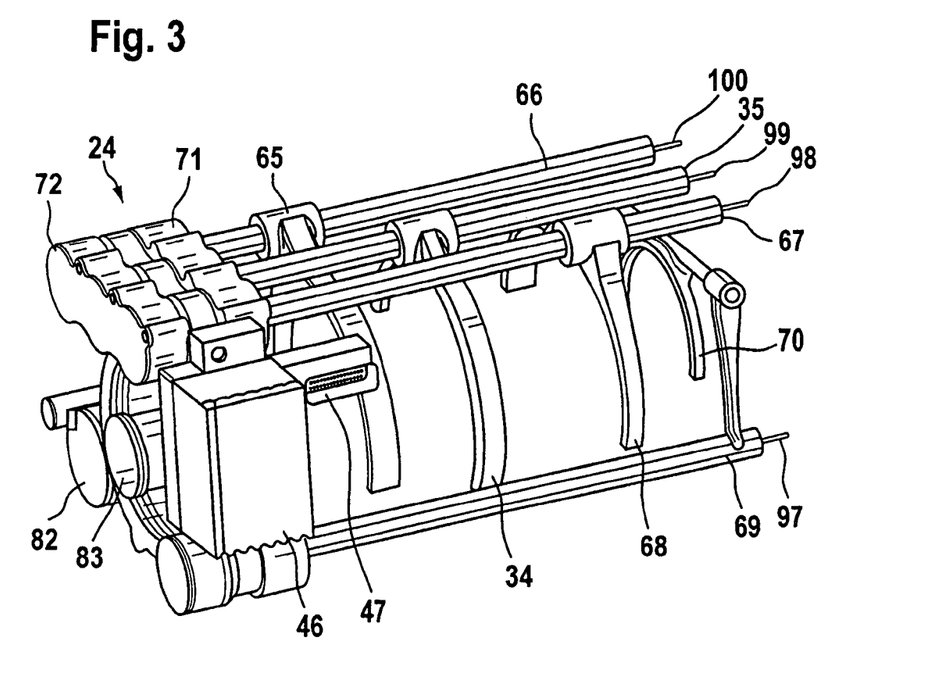
FIG. 3 shows a gear shift device of the automatic transmission.

According to FIG. 3, gear shift elements of the automatic transmission 20 in the form of gear shift forks 34, 65, 68 and 70 are connected to gear shift rods 35, 66, 67 and 69. When the gear shift rods 35, 66, 67 and 69 move, the gear shift forks 34, 65, 68 and 70 are also moved. The gear shift fork 65 can be used to shift the split group 77, forward gearspeeds of the main transmission 22 with the gear shift forks 34 and 68, and a reverse gearspeed of the main transmission 22 with the gear shift fork 70.

The gear shift rods 35, 66, 67 and 69 are connected to pistons of piston cylinder units (not illustrated in FIG. 3) so that a movement of the pistons is transmitted to the gear shift rods 35, 66, 67 and 69 and thus to the gear shift forks 34, 65, 68 and 70. The piston cylinder units are arranged in a gear shift module 24 which has a module baseplate 71 and a module cover 72.

The electronic control device 46 is arranged on the gear shift module 24, which control device 46 can be supplied with voltage via a transmission plug 47 and connected to other control devices of the motor vehicle.

The gear shift rods 35, 66, 67 and 69 have sensor pins 99, 100, 98 and 97 at their end facing away from the gear shift module. The sensor pins 99, 100, 98 and 97 are embodied as thin pins which run coaxially with respect to the gear shift rods 35, 66, 67 and 69. The sensor pins 99, 100, 98 and 97 dip into what are referred to as sensor coils 103-107 which are arranged on the sensor module 25. It is thus possible to sense the position of the gear shift rods 35, 66, 67 and 69.

Figure 4:
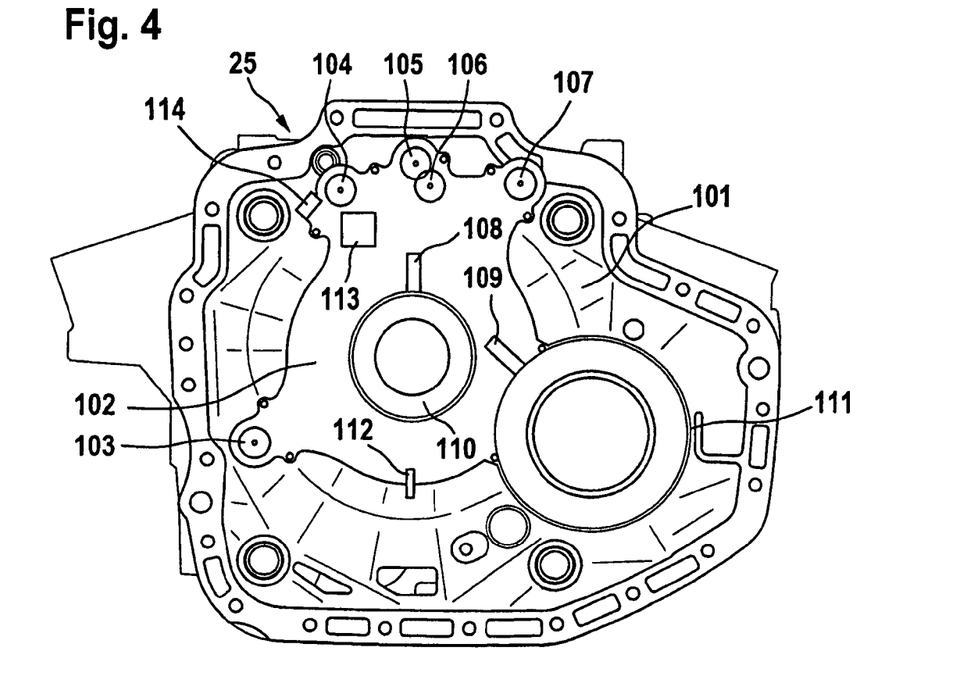
FIG. 4 shows a sensor module which is arranged in a housing part of the transmission.

According to FIG. 4, the sensor module 25 is arranged on a rear wall 101 of the central housing part 80. The rear wall 101 is adjoined by the auxiliary group 23. The sensor module 25 is composed of a circuit board 102 on which 5 sensor coils 103-107 are arranged. The sensor coils 103-107 are arranged in such a way that the sensor pins 99, 100, 98 and 97 of the gear shift rods 35, 66, 67 and 69 can dip into the sensor coils 103-107. By means of the sensor coils 103-107 it is possible to determine how far the sensor pins 99, 100, 98 and 97 dip in. It is thus possible to determine the position of the gear shift rods 35, 66, 67 and 69. The sensor module 25 also has two inductive rotational speed sensors 108 and 109 by means of which the rotational speed of the sensor gearwheels 110 and 111 can be measured. The sensor gearwheel 110 is connected in a rotationally fixed fashion to a main shaft (not illustrated), and the sensor wheel 111 is connected in a rotationally fixed fashion to the countershaft (not illustrated). The rotational speeds of the main shaft and of the countershaft can thus be determined with the rotational speed sensors 108 and 109. Furthermore, the sensor module 25 includes a temperature sensor 112 by means of which the temperature of the transmission oil can be measured.

All the sensors are connected to an evaluation module 113 by means of electrical connections on the circuit board 102. The evaluation module 113 determines the individual operating variables from the sensor signals. The sensor module 25 and thus also the evaluation module 113 are connected to the control device 46 via a plug 114.

Figure 5:
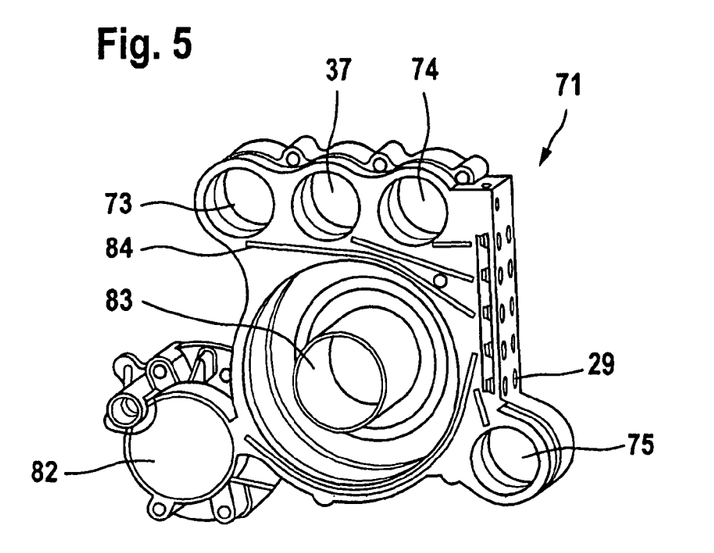
FIG. 5 shows a module baseplate of a gear shift module of the gear shift device.

According to FIG. 5, the module base body 71 of the gear shift module 24 forms part of the cylinders of the piston cylinder units 37, 73, 74 and 75 which are provided for operating the gear shift rods 35, 66, 67 and 69. The module base body 71 also forms a housing 82 of a countershaft brake and part of a carrier body 83 of a central clutch disengager. The carrier body 83 is in this context essentially in the shape of a hollow cylinder. The countershaft brake and the clutch disengager are also operated by means of compressed air.

The module base body 71 mainly has cylindrical recesses 29 which can partially accommodate electromagnetically activated valves. By means of the valves it is possible to feed compressed air to the piston cylinder units, the clutch disengager and the countershaft brake or to release pressure from them. For this purpose, the module base body 71 contains passages 84 which connect the piston cylinder units, the countershaft brake and the clutch disengager to the valves which are assigned to them.

The valves for actuating the piston cylinder unit 78 are connected to the piston cylinder unit 78 by means of the fluid lines of the connecting line 10. For this purpose, the module base body 71 has ports 85. The ports 85 are embodied, according to FIG. 6, as short tubes which are connected to the associated recesses 49.

Figures 6, 7:
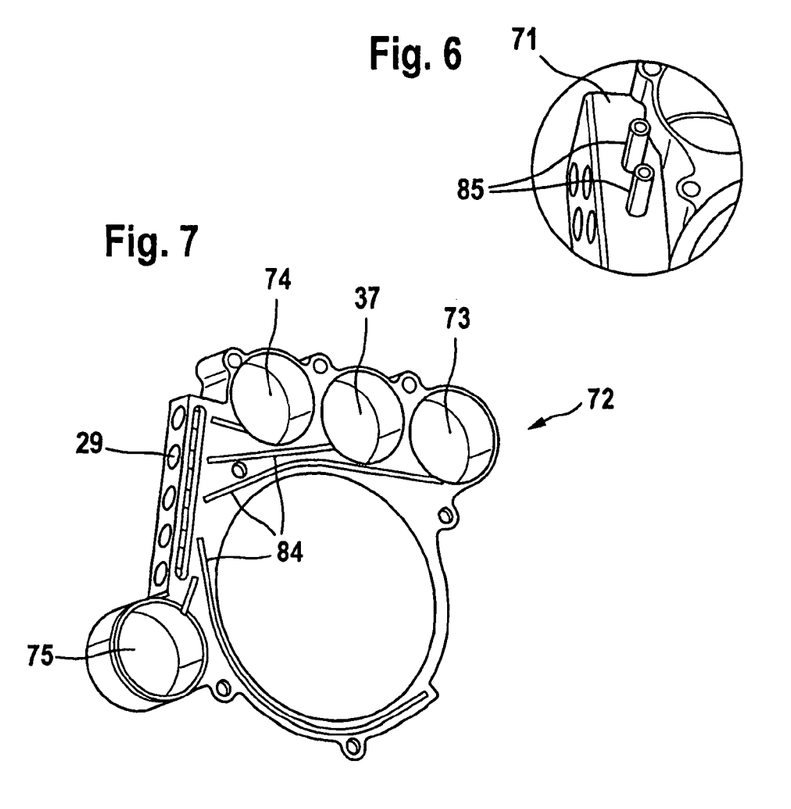
FIG. 6 shows a compressed air port of the module baseplate.
FIG. 7 shows a module cover of the gear shift module.

According to FIG. 7, the module cover 72 of the gear shift module 24 also forms part of the cylinders of the piston cylinder units 37, 73, 74 and 75. Furthermore, the module cover 72 has, mainly cylindrical recesses 29 which can partially accommodate valves. In order to distribute the compressed air, the module cover also includes passages 84.

The module base body 71 and the module cover 72 are embodied as aluminum cast parts.

The module cover 72 and the module base body 71 are screwed to the front housing part 79 in the direction of the split group 77 in such a way that, together, they form the cylinders of the piston cylinder units 37, 73, 74 and 75. The piston cylinder unit 37 is illustrated schematically in FIG. 8 by way of example. Two hollow pistons 86 and 87 are arranged inside the cylinder. The hollow pistons 86 and 87 each have two different diameters D1, D2, and they are arranged here inside the cylinder in such a way that in each case the smaller diameter D2 is directed axially inward. The cylinder has diameters which correspond to the diameters D1, D2 of the hollow pistons 86 and 87 so that a stop 90 is formed axially to the left for the right-hand hollow cylinder 87, and a stop 89 is formed axially to the right for the left-hand hollow cylinder 86. An internal piston 88, which is permanently connected to a piston rod 91, is displaceably arranged inside the hollow pistons 86 and 87. The piston rod 91 is in turn connected to the gear shift rod 35 so that when the piston 88 is displaced within the cylinder the gear shift rod 35 is also displaced.

Figure 8:
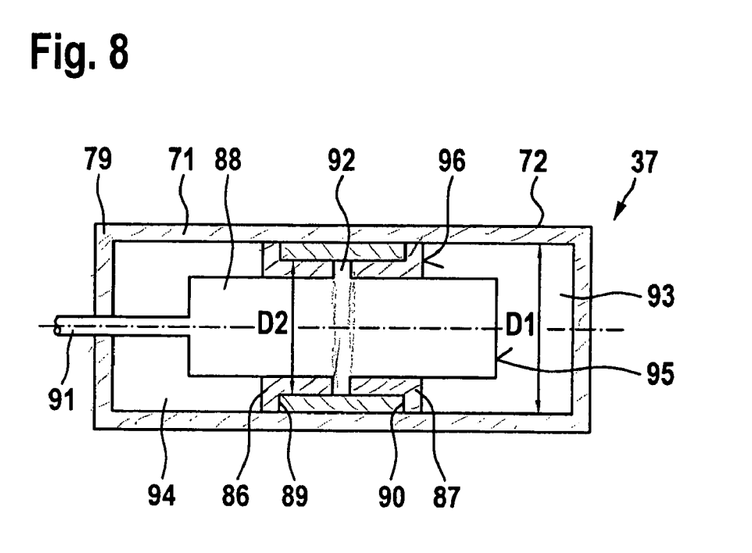
FIG. 8 shows a symmetrical three-position cylinder.

The piston 88 has a collar 92 which has a diameter corresponding to the smaller diameter D2 of the hollow pistons 86 and 87. The piston 88 is arranged in such a way that the collar 92 lies between the hollow pistons 86 and 87.

The module cover 72, the piston 88 and the hollow piston 87 form a right-hand pressure chamber 93, and the module body 71, the front housing part 79, the piston 88 and the hollow piston 86 form a left-hand pressure chamber 94. The pressure chambers 93 and 94 are connected to ducts 84 (not illustrated in FIG. 6) by means of valves which are assigned to them. In the pressure chambers 93 and 94, pressure can therefore be adjusted, that is to say said pressure chambers 93 and 94 can be pressurized or depressurized, that is to say vented.

If the right-hand pressure chamber 93 is pressurized in the illustrated central position of the piston 88, and the left-hand pressure chamber 94 is vented, the piston 88 and the hollow piston 86 are displaced to the left until the piston 88 abuts against the front housing part 79. The hollow piston 87 remains in the illustrated position. The force which acts on the piston rod 91 results from the pressure in the pressure chamber 93 and the piston face 95 of the piston 88.

If the piston 88 is then to be moved to the right again, the left-hand pressure chamber 94 is pressurized and the pressure chamber 93 is vented. The piston 88 and the hollow piston 86 therefore move to the right. The hollow piston 86 moves to the right until it abuts against the stop 89 of the cylinder. The piston 88 moves further until the piston face 95 abuts against the module cover 72.

The force acting on the piston rod 91 here results for the first part of the movement during which the hollow piston 86 is also moved, from the pressure in the pressure chamber 94 and from the sum of the area of the piston face 95 of the piston 88 and of that of the piston face 96 of the hollow piston 86. The force is therefore larger than the force generated when the piston 88 is pushed out and the hollow piston 87 is stationary. As soon as the hollow piston 86 is stationary, the movement of the piston 88 corresponds to the described movement of the piston to the left. The force therefore also becomes smaller.

If the illustrated central position of the piston is to be adjusted, the movement of the piston 88 to the right has to be braked by correctly timed venting of the pressure chamber 93. The central position is held if both pressure chambers 93 and 94 are pressurized.

Since the piston cylinder unit 37 has three stable positions and the force which is applied is equally large in both activation directions, such a piston cylinder unit is referred to as a symmetrical three position cylinder. However, it is also possible to use an asymmetrical three position cylinder in which the forces acting in the two activation directions are different in magnitude.

Figure 9:
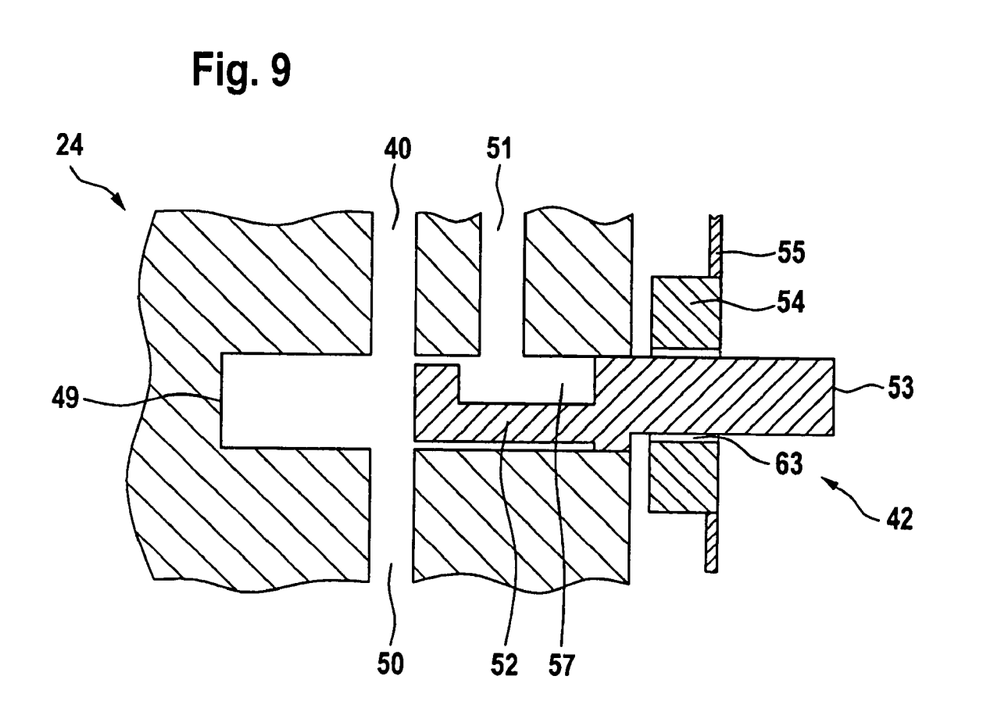
FIG. 9 shows a detail of the gear shift device with an electromagnetically activated valve.

FIG. 9 illustrates the arrangement of a valve 42 in the gear shift module 24 and of the control device 46 by way of example for the arrangement of all the valves. As shown in FIG. 9, the gear shift module 24 has a mainly cylindrical recess 49 which accommodates part of the valve 42. The gear shift module 24 has a zero outflow 50 to the surroundings, which is arranged aligned with a pressure line 40 which serves as an actuator port of the valve 42. The pressure line 40 is connected via a duct 84 to a pressure chamber of a piston cylinder unit. The pressure line 40 and the zero outflow 50 are separated by the recess 49. Furthermore, the gear shift module 24 has a supply line 51 which is arranged parallel to the pressure line 40 and is connected to a compressed air port. The gear shift device is supplied with compressed air via the compressed air port. The supply line 51 also opens into the recess 49. The valve 42 has a cylindrical piston 52 which can be displaced within the recess 49. The part 53 of the valve 42 which lies opposite the piston 52 is arranged in the control device 46. One section of the part 53 of the valve 42 is surrounded by an electromagnetic coil 54 which is arranged on a circuit board 55 of the control device 46. A cavity 63 which is formed by the coil 54 therefore constitutes a recess in the control device 46 which accommodates part of the valve 42. The piston 52 of the valve 42 can be displaced in the recess 49 of the gear shift module 24 by correspondingly electrically energizing the coil 54. The valve 42 is arranged completely within the control device 46 (not illustrated in FIG. 9).

In the illustrated, completely retracted position of the piston 52, the coil 54 is not energized. The illustrated position therefore constitutes a position of rest of the valve 42. In this position of rest, the pressure line 40 is connected to the zero outflow 50 via the recess 49. The pressure space 38 of the piston cylinder unit 37 is therefore pressureless. By correspondingly actuating the coil 54 it is possible for the piston 52 to be displaced in the direction of the pressure line 40 to such an extent that the pressure line 40 is closed off by the piston 52. In this position, an instantaneously prevailing pressure in the pressure line 40 is maintained. If the piston 52 is displaced even further by corresponding actuation, the supply line 51 is connected to the pressure line 40 via a recess 57 in the piston 52. In this position, compressed air is fed into the pressure chamber of the piston cylinder unit and the pressure chamber is therefore pressurized.

The gear shift device has a total of 15 valves, with ten valves being arranged in the module baseplate 71 and five valves being arranged in the module cover 72. Each of the five piston cylinder units 37, 73, 74, 75, 78 for activating the gear shift rods 35, 66, 67 and 69 and the group transmission 23 has two pressure chambers which are each assigned a valve. Four valves are necessary to activate the clutch disengager and one valve is necessary for the countershaft brake.

During operation of the transmission 20, two gear speeds of the main transmission 22 must never be engaged at the same time. As a result, only one gear shift rod of the main transmission 22 can be outside a neutral position. This is ensured by locking the gear shift rods. The lock arrangement is shown schematically in FIGS. 10a, 10b and 10c. Three gear shift rods 115, 116 and 117 are arranged parallel to one another. The outer gear shift rods 115 and 117 each have a recess 121, 122. The central gear shift rod 116 has two recesses 123 and 124 which are arranged diametrically with respect to one another. In one housing 125, two locking bolts 118 and 119 are mounted displaceably in a row. An intermediate bolt 120, which extends through the gear shift rod 116 and can also be displaced, is arranged between the locking bolts 118 and 119.

Figure 10A:
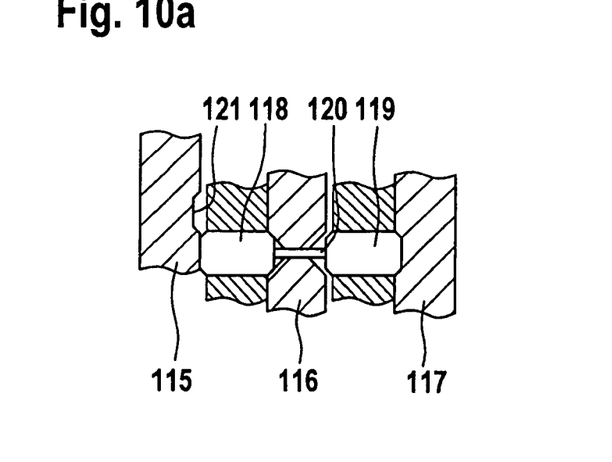
FIG. 10 shows a lock for gear shift rods.
Figure 10B:
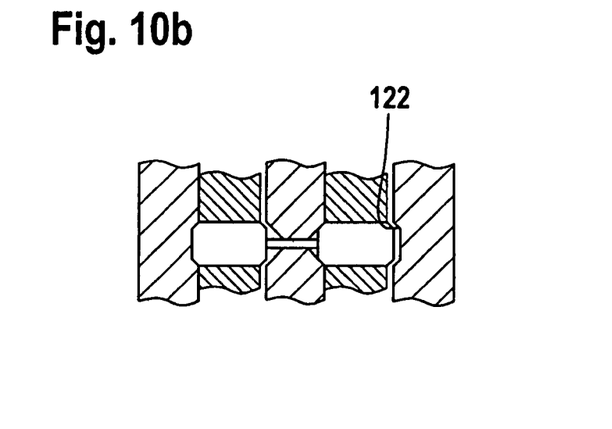

In the position which is illustrated in FIG. 10b and in which all the gear shift rods 115, 116 and 117 are in the neutral position, the recesses 121, 122, 123, 124, the locking bolts 118, 119 and the intermediate bolt 120 are arranged in such a way that the locking bolts 118 and 119 and the intermediate bolt 120 can be displaced individually or together in the direction of the two outer gear shift rods 115 and 117. Each of the gear shift rods 115, 116 and 117 can be displaced out of this position.

In the position illustrated in FIG. 10a, the outer gear shift rod 115 is displaced out of the neutral position. The locking bolt 118 is therefore no longer in the recess 121 of the gear shift rod 115. As a result of this, the locking bolt 118 is pressed into the recess 123 in the gear shift rod 116 and the locking bolt 119 is pressed into the recess 122 in the gear shift rod 117 with intermediate connection of the intermediate bolt 120. The gear shift rods 116 and 117 are therefore fixed with respect to the housing 125 and can no longer be displaced.

Figure 10C:
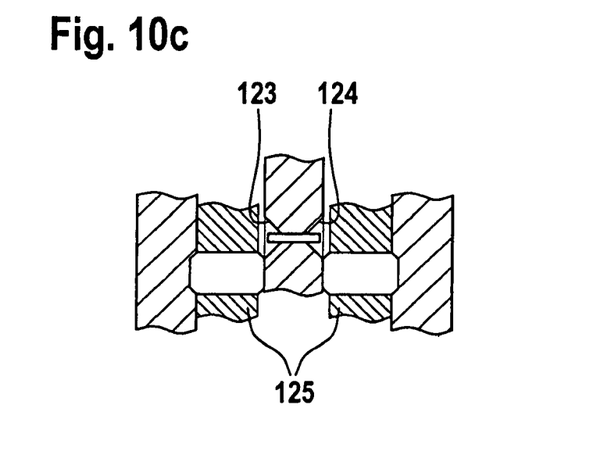

In the position which is illustrated in FIG. 10c, the central gear shift rod 116 is displaced out of the neutral position. As a result, the locking bolts 118 and 119 are no longer located in the recesses 123 and 124 of the gear shift rod 116. As a consequence of this, the locking bolt 118 is pressed into the recess 121 in the gear shift rod 115 and the locking bolt 119 is pressed into the recess 122 in the gear shift rod 117. The gear shift rods 115 and 117 are thus fixed with respect to the housing 125 and can no longer be displaced.

The locking arrangement which is illustrated in FIGS. 10a, 10b and 10c is integrated into a bearing plate in which the gear shift rods of the transmission 20 are mounted.

What is claimed is:

1. An automated transmission (20) of a motor vehicle, the automated transmission having a main transmission (22) and a first auxiliary group (23),
    the main transmission (22) and the first auxiliary group (23) including a gear shift device with gear shift elements (34, 68, 70) which can be operated by means of main fluid-actuated piston cylinder units (37, 74, 75,) and a remote piston cylinder unit (78) for shifting the auxiliary group (23),
    the main piston cylinder units (37, 74, 75) for shifting the main transmission (22) being combined in a gear shift module (24),
    the remote piston cylinder unit (78) for shifting the first auxiliary group (23) being arranged axially spaced apart from the gear shift module (24) adjacent the first auxiliary group (23), and
    the remote piston cylinder unit (78) which is arranged spaced apart from the gear shift module (24) being connected to the gear shift module (24) by way of a fluid line (10), the gear shift module (24) including a module base plate (71) which forms part of the cylinders of the main piston cylinder units (37, 74, 75) and at least part of a housing (82) for at least one of a countershaft brake and a central clutch disengager (83) of a starting clutch (76).

2. The automated transmission as claimed in claim 1, wherein each piston cylinder unit (37, 74, 75, 78) is assigned an individual gear shift element (34, 68, 70) of the main transmission (22) or of the first auxiliary group (23).

3. The automated transmission as claimed in claim 1, wherein the piston cylinder unit (78) which is arranged spaced apart from the gear shift module (24) is arranged in a housing (81) of the first auxiliary group (23).

4. The automated transmission according to claim 1, wherein the fluid line (10) extends from the gear shift module (24) to the remote piston cylinder unit (78), the gear shift module (24) including the solenoids for controlling the admission of control fluid to the piston cylinder units for shifting the main transmission and also those for shifting the auxiliary transmission.

5. The automated transmission as claimed in claim 1, wherein the transmission (20) includes a second auxiliary group (77), and a piston cylinder unit (73) for operating a gear shift element (65) of the second auxiliary group (77) is arranged in the gear shift module (24).

6. The automated transmission as claimed in claim 5, wherein
    the gear shift elements (34, 65, 68, 70) can be operated by means of electromagnetically activated valves (42),
    the gear shift module (24) has recesses (49), each recess (49) at least partially accommodating one of the valves (42),
    the valves (42) being actuated by a control device (46) which
    is arranged on the gear shift module (24), and which
    has openings (63), each partially accommodating one of the valves (42), and
    coils (54) for electromagnetically activating the valves (42),
    the recesses and openings (49, 63) and the coils (54) being arranged in such a way that in each case a recess (49) in the gear shift module (24) and an opening (63) in the control device (46) cooperate so as to jointly accommodate a valve (42) which can be actuated by means of a coil (54).

7. The automated transmission as claimed in claim 6, wherein all the valves (42) are functionally identical so that they are interchangeable.

8. The automated transmission as claimed in claim 6, wherein the recesses (49) in the gear shift module (24) and the control device (46) are arranged in such a way that the control device (46) and the valves (42) can be removed without the need for opening a housing (79, 80, 81) of the transmission (20).

9. The automated transmission as claimed in claim 6, wherein the gear shift device has a sensor module (25) which is arranged spaced apart from the gear shift module (24), the sensor module (25) having sensors (103-109, 112) for sensing operational variables of the transmission (20), and the sensors (103-109, 112) having a signal conducting connection to the control device (46).

10. The automated transmission as claimed in claim 9, wherein the sensor module (25) is arranged between the main transmission (22) and the first auxiliary group (23).

11. The automated transmission as claimed in claim 9, wherein the sensor module (25) includes an evaluation module (113), for preprocessing signals of the sensors (103-109, 112) and transmitting them to the control device (46) via data transmission lines (13).

12. The automated transmission as claimed in claim 9, wherein the sensor module (25) is supplied with a supply voltage by the control device (46) via supply lines (12).

13. The automated transmission as claimed in claim 9, wherein at least one of supply lines (12) and signal lines (13) extends between the sensor module (25) and the control device (46) along the fluid line (11) which extends between the gear shift module (24) and the piston cylinder unit of the first auxiliary group (23).

14. The automated transmission as claimed in claim 13, wherein at least two of the fluid line (11), the supply lines (12) and data lines (13) are embedded together in a plastic sheath (14).

* * * * *